US008818401B2

(12) United States Patent
Gupta et al.

(10) Patent No.: US 8,818,401 B2
(45) Date of Patent: Aug. 26, 2014

(54) METHODS AND APPARATUSES FOR USE IN DETERMINING THAT A MOBILE STATION IS AT ONE OR MORE PARTICULAR INDOOR REGIONS

(75) Inventors: Rajarshi Gupta, Sunnyvale, CA (US); Eric K. Holm, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 13/191,097

(22) Filed: Jul. 26, 2011

(65) Prior Publication Data

US 2012/0028649 A1 Feb. 2, 2012

Related U.S. Application Data

(60) Provisional application No. 61/369,983, filed on Aug. 2, 2010, provisional application No. 61/369,548, filed on Jul. 30, 2010.

(51) Int. Cl.
*H04W 24/00* (2009.01)

(52) U.S. Cl.
USPC .............. 455/456.1; 455/456.3; 455/437; 455/444; 455/524; 455/411

(58) Field of Classification Search
CPC ....... H04W 4/02; H04W 64/00; H04W 4/025; H04W 64/003; H04W 4/023; H04W 24/00
USPC ........ 455/456.3, 456.1, 456, 437, 556.1, 444, 455/11.1, 438, 524, 411; 370/252, 329, 370/254, 466, 419, 41.1, 474, 531, 255
See application file for complete search history.

(56) References Cited

U.S. PATENT DOCUMENTS

| 7,039,421 | B2 | 5/2006 | Couronne et al. |
| 7,424,532 | B1 | 9/2008 | Subbiah |
| 7,751,971 | B2 | 7/2010 | Chang et al. |
| 8,164,444 | B2 | 4/2012 | Anderson et al. |

(Continued)

FOREIGN PATENT DOCUMENTS

| EP | 1736792 A1 | 12/2006 |
| JP | 2001358850 A | 12/2001 |

(Continued)

OTHER PUBLICATIONS

Beal, James, R. Jr., "Contextual Geolocations: A specialized Application for Improving Indoor Location Awareness in Wireless Local Area Networks", College of Graduate Studies and Reasearch, Minnesota State University—Monkato, MICS2003: The 36th Annual Midwest Instruction and Computing Symposium, 2003.

(Continued)

*Primary Examiner* — Joseph Arevalo
(74) *Attorney, Agent, or Firm* — Berkeley Law & Technology Group, LLP

(57) ABSTRACT

Methods and apparatuses are provided which may be implemented in various devices for to determine or assist in determining that a mobile station is at one or more particular indoor regions and to provide positioning assistance data and/or the like to the mobile station with regard to at least the one or more particular indoor regions.

32 Claims, 8 Drawing Sheets

(56) References Cited

U.S. PATENT DOCUMENTS

| | | |
|---|---|---|
| 2002/0164952 A1 | 11/2002 | Singhal et al. |
| 2002/0171581 A1 | 11/2002 | Sheynblat et al. |
| 2003/0011467 A1 | 1/2003 | Suomela |
| 2005/0204057 A1 | 9/2005 | Anderson et al. |
| 2005/0271072 A1 | 12/2005 | Anderson et al. |
| 2006/0010237 A1 | 1/2006 | Banatre et al. |
| 2006/0034326 A1 | 2/2006 | Anderson et al. |
| 2006/0087425 A1 | 4/2006 | Haeberlen et al. |
| 2006/0142027 A1 | 6/2006 | Krishnamurthi et al. |
| 2006/0212561 A1 | 9/2006 | Feng |
| 2007/0001950 A1* | 1/2007 | Zhang et al. ............... 345/88 |
| 2007/0139411 A1 | 6/2007 | Jawerth et al. |
| 2007/0184845 A1 | 8/2007 | Troncoso |
| 2007/0201421 A1 | 8/2007 | Huseth |
| 2009/0043502 A1 | 2/2009 | Shaffer et al. |
| 2009/0174600 A1 | 7/2009 | Mazlum et al. |
| 2009/0271271 A1 | 10/2009 | Johnson |
| 2010/0036717 A1 | 2/2010 | Trest |
| 2010/0048163 A1 | 2/2010 | Parr et al. |
| 2010/0120450 A1 | 5/2010 | Herz |
| 2010/0151882 A1 | 6/2010 | Gillies et al. |
| 2010/0156713 A1 | 6/2010 | Harper |
| 2010/0157848 A1 | 6/2010 | Das et al. |
| 2010/0217723 A1 | 8/2010 | Sauerwein, Jr. et al. |
| 2011/0034184 A1 | 2/2011 | Rothschild |
| 2011/0081919 A1 | 4/2011 | Das |
| 2011/0087431 A1 | 4/2011 | Gupta et al. |
| 2011/0090123 A1 | 4/2011 | Sridhara et al. |
| 2011/0116453 A1 | 5/2011 | Huang et al. |
| 2011/0138064 A1* | 6/2011 | Rieger et al. ............... 709/228 |
| 2011/0173565 A1* | 7/2011 | Ofek et al. ............... 715/790 |
| 2011/0178703 A1 | 7/2011 | Aben et al. |
| 2011/0244887 A1 | 10/2011 | Dupray et al. |
| 2011/0248887 A1 | 10/2011 | Whelan et al. |
| 2011/0250904 A1 | 10/2011 | Valletta et al. |
| 2011/0274000 A1 | 11/2011 | King et al. |
| 2011/0282947 A1 | 11/2011 | Dodson |
| 2011/0285591 A1 | 11/2011 | Wong |
| 2012/0021762 A1 | 1/2012 | Garin et al. |
| 2012/0028654 A1 | 2/2012 | Gupta et al. |

FOREIGN PATENT DOCUMENTS

| | | |
|---|---|---|
| JP | 2002296064 A | 10/2002 |
| JP | 2003161772 A | 6/2003 |
| JP | 2004048289 A | 2/2004 |
| JP | 2005070115 A | 3/2005 |
| JP | 2006502396 A | 1/2006 |
| JP | 2006108959 A | 4/2006 |
| JP | 2007066290 A | 3/2007 |
| JP | 2008033043 A | 2/2008 |
| JP | 2008112256 A | 5/2008 |
| JP | 2008537102 A | 9/2008 |
| JP | 2009020070 A | 1/2009 |
| JP | 2009055138 A | 3/2009 |
| JP | 2010159980 A | 7/2010 |
| JP | 2010164434 A | 7/2010 |
| WO | WO2008064535 A1 | 6/2008 |
| WO | WO2010022797 A1 | 3/2010 |
| WO | WO-2010059934 | 5/2010 |

OTHER PUBLICATIONS

International Search Report and Written Opinion—PCT/US2011/045505, ISA/EPO—Oct. 31, 2011.

Miu, Design and Implementation of an Indoor Mobile Navigation System, Master of Science Thesis, Massachusetts Institute of Technology, pp. 1-60, Cambridge, Massachusetts, 2002.

* cited by examiner

400

Transmit A Request For A Repository Device Identifier To A Directory Device, The Request For The Repository Device Identifier Being Indicative Of At Least A First Estimated Location Of The Mobile Station
— 402

Receive A Response From The Directory Device Identifying One Or More Identifiers For Preliminary Positioning Assistance Data For One Or More Indoor Regions Determined To Be At Or Nearby To The First Estimated Location
— 404

Obtain Preliminary Positioning Assistance Data Based, At Least In Part, On At Least One Of The Identifiers
— 406

Determine That The Mobile Station At A First One Of The One Or More Indoor Regions Based, At Least In Part, On A Signal Characteristic Measurement For A Signal Received From A Transmitter Identified In The Preliminary Positioning Assistance Data
— 408

FIG. 4

METHODS AND APPARATUSES FOR USE IN DETERMINING THAT A MOBILE STATION IS AT ONE OR MORE PARTICULAR INDOOR REGIONS

This patent application claims benefit of and priority to co-pending U.S. Provisional Patent Application 61/369,983, filed Aug. 2, 2010, Titled, "LCI DISAMBIGUATION", and which is hereby incorporated by reference.

This patent application claims benefit of and priority to co-pending U.S. Provisional Patent Application 61/369,548, filed Jul. 30, 2010, Titled, "MOBILE-SERVER ARCHITECTURE OPTIONS", and which is hereby incorporated by reference.

BACKGROUND

1. Field

The subject matter disclosed herein relates to electronic devices, and more particularly to methods and apparatuses for use in various devices comprising computing platforms and/or mobile stations to determine or assist in determining that a mobile station is at one or more particular indoor regions.

2. Information

The Global Positioning System (GPS) represents one type of Global Navigation Satellite System (GNSS), which along with other types of satellite positioning systems (SPS) provide or otherwise support signal-based position location capabilities (e.g., navigation functions) in mobile stations, and particularly in outdoor environments. However, since some satellite signals may not be reliably received and/or acquired by a mobile station within an indoor environment or other like mixed indoor/outdoor environments, different techniques may be employed to enable position location services.

For example, mobile stations may attempt to obtain a position fix by measuring ranges to three or more terrestrial transmitters (e.g., wireless access points, beacons, cell towers, etc.) which are positioned at known locations. Such ranges may be measured, for example, by obtaining a MAC ID address from signals received from such transmitters and obtaining range measurements to the transmitters by measuring one or more characteristics of signals received from such transmitters such as, for example, signal strength, a round trip delay time, etc.

These and other like position location and navigation techniques tend to be of further benefit to a user if presented with certain mapped features. For example, mapped features may relate to or otherwise identify certain physical objects, characteristics, or points of interest within a building or complex, etc. Thus, in certain instances, an indoor navigation system may provide a digital electronic map to a mobile station upon entering a particular indoor area, e.g., in response to a request for assistance data. Such a map may show indoor features such as doors, hallways, entry ways, walls, etc., points of interest such as bathrooms, pay phones, room names, stores, etc. Such a digital electronic map may be stored at a server to be accessible by a mobile station through selection of a URL, for example. By obtaining and displaying such a map, a mobile station may overlay a current location of the mobile station (and user) over the displayed map to provide the user with additional context.

In certain instances, some of the information that may be provided to and/or otherwise used by a mobile station for navigational or other like purposes may result in data files of significantly large size. Thus, it may be useful to carefully control the need for such information to be transmitted, stored, and/or processed by the various devices and communications resources.

SUMMARY

Various example methods and apparatuses are provided which may be implemented in various devices for to determine or assist in determining that a mobile station is at one or more particular indoor regions and to provide positioning assistance data and/or the like to the mobile station with regard to at least the one or more particular indoor regions.

In accordance with certain example implementations a method may be implemented at a mobile station which comprises: transmitting a request for a repository device identifier to a directory device, the request for the repository device identifier being indicative of at least a first estimated location of the mobile station; receiving a response from the directory device, the response identifying one or more identifiers for preliminary positioning assistance data for one or more indoor regions determined to be at or nearby to the first estimated location; obtaining at least a portion of the preliminary positioning assistance data based, at least in part, on at least one of the identifiers; and determining that the mobile station is at a first one of the one or more indoor regions based, at least in part, on a signal characteristic measurement for a signal received from a transmitter identified in the at least the portion of the preliminary positioning assistance data.

In accordance with certain other example implementations, an apparatus may be provided for use in a mobile station, and which comprises: means for initiating transmission of a request for a repository device identifier to a directory device, the request for the repository device identifier being indicative of at least a first estimated location of the mobile station; means for receiving a response from the directory device, the response identifying one or more identifiers for preliminary positioning assistance data for one or more indoor regions determined to be at or nearby to the first estimated location; means for obtaining at least a portion of the preliminary positioning assistance data based, at least in part, on at least one of the identifiers; and means for determining that the mobile station at a first one of the one or more indoor regions based, at least in part, on a signal characteristic measurement for a signal received from a transmitter identified in the at least the portion of the preliminary positioning assistance data.

In accordance with still other example implementations, a mobile station may be provided which comprises: a network interface; and a processing unit to: initiate transmission of a request for a repository device identifier to a directory device via the network interface, the request for the repository device identifier being indicative of at least a first estimated location of the mobile station; obtain a response from the directory device via the network interface, the response identifying one or more identifiers for preliminary positioning assistance data for one or more indoor regions determined to be at or nearby to the first estimated location; obtain, via the network interface, at least a portion of the preliminary positioning assistance data based, at least in part, on at least one of the identifiers; and determine that the mobile station at a first one of the one or more indoor regions based, at least in part, on a signal characteristic measurement for a signal received from a transmitter identified in the at least the portion of the preliminary positioning assistance data.

In accordance with yet other example implementations, an article of manufacture may be provided which comprises a non-transitory computer readable medium having stored therein computer implementable instructions that are executable by a special purpose electronic computing device, e.g., at a mobile station, to: initiate transmission of a request for a repository device identifier to a directory device, the request for the repository device identifier being indicative of at least a first estimated location of the mobile station; obtain a response from the directory device, the response identifying one or more identifiers for preliminary positioning assistance data for one or more indoor regions determined to be at or nearby to the first estimated location; obtain at least a portion of the preliminary positioning assistance data based, at least in part, on at least one of the identifiers; and determine that the mobile station at a first one of the one or more indoor regions based, at least in part, on a signal characteristic measurement for a signal received from a transmitter identified in the at least the portion of the preliminary positioning assistance data.

In accordance with certain other example implementations, a method may be implemented, e.g., at a directory station, which comprises: receiving a request for a repository device identifier from a mobile station, the request for the repository device identifier being indicative of at least a first estimated location of the mobile station; determining one or more indoor regions that are at or nearby the first estimated location; and transmitting a response to the mobile station, the response identifying one or more identifiers for preliminary positioning assistance data for the one or more indoor regions.

In accordance with certain other example implementations, an apparatus may be provided, e.g., for use in a directory station, and which comprises: means for receiving a request for a repository device identifier from a mobile station, the request for the repository device identifier being indicative of at least a first estimated location of the mobile station; means for determining one or more indoor regions that are at or nearby the first estimated location; and means for transmitting a response to the mobile station, the response identifying one or more identifiers for preliminary positioning assistance data for the one or more indoor regions.

In accordance with still other example implementations, a computing platform may be provided, e.g., at a directory station, which comprises: a network interface; and a processing unit to: obtain a request for a repository device identifier from a mobile station via the network interface, the request for the repository device identifier being indicative of at least a first estimated location of the mobile station; determine one or more indoor regions that are at or nearby the first estimated location; and initiate transmission of a response to the mobile station via the network interface, the response identifying one or more identifiers for preliminary positioning assistance data for the one or more indoor regions.

In accordance with yet other example implementations, an article of manufacture may be provided which comprises a non-transitory computer readable medium having stored therein computer implementable instructions that are executable by a special purpose computing platform, e.g., at a directory device, to: obtain a request for a repository device identifier from a mobile station, the request for the repository device identifier being indicative of at least a first estimated location of the mobile station; determine one or more indoor regions that are at or nearby the first estimated location; and initiate transmission of a response to the mobile station, the response identifying one or more identifiers for preliminary positioning assistance data for the one or more indoor regions.

In accordance with certain other example implementations, a method may be implemented, e.g., at a repository device, which comprises: receiving a request for preliminary positioning assistance data for an indoor region from a mobile station, the request for the preliminary positioning assistance data being indicative of a identifier for the preliminary positioning assistance data; and transmitting the preliminary positioning assistance data to the mobile station, the preliminary positioning assistance data comprising at least a portion of an access point locator for the indoor region.

In accordance with certain other example implementations, an apparatus may be provided for use in a repository device and which comprises: means for obtaining a request for preliminary positioning assistance data for an indoor region from a mobile station, the request for the preliminary positioning assistance data being indicative of a identifier for the preliminary positioning assistance data; and means for transmitting the preliminary positioning assistance data to the mobile station, the preliminary positioning assistance data comprising at least a portion of an access point locator for the indoor region.

In accordance with still other example implementations, a computing platform, e.g., at a repository device, may be provided which comprises: a network interface; and a processing unit to: obtain a request for preliminary positioning assistance data for an indoor region from a mobile station via the network interface, the request for the preliminary positioning assistance data being indicative of a identifier for the preliminary positioning assistance data; and initiate transmission of the preliminary positioning assistance data to the mobile station via the network interface, the preliminary positioning assistance data comprising at least a portion of an access point locator for the indoor region.

In accordance with yet other example implementations, an article of manufacture may be provided which comprises a non-transitory computer readable medium having stored therein computer implementable instructions that are executable by a special purpose computing platform, e.g., at a repository device, to: obtain a request for preliminary positioning assistance data for an indoor region from a mobile station via the network interface, the request for the preliminary positioning assistance data being indicative of a identifier for the preliminary positioning assistance data; and initiate transmission of the preliminary positioning assistance data to the mobile station, the preliminary positioning assistance data comprising at least a portion of an access point locator for the indoor region.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 4 is a flow diagram illustrating certain features of an example process or method for a mobile station to determine that the mobile station is at a particular indoor region, in accordance with an implementation.

DETAILED DESCRIPTION

Figure 1:
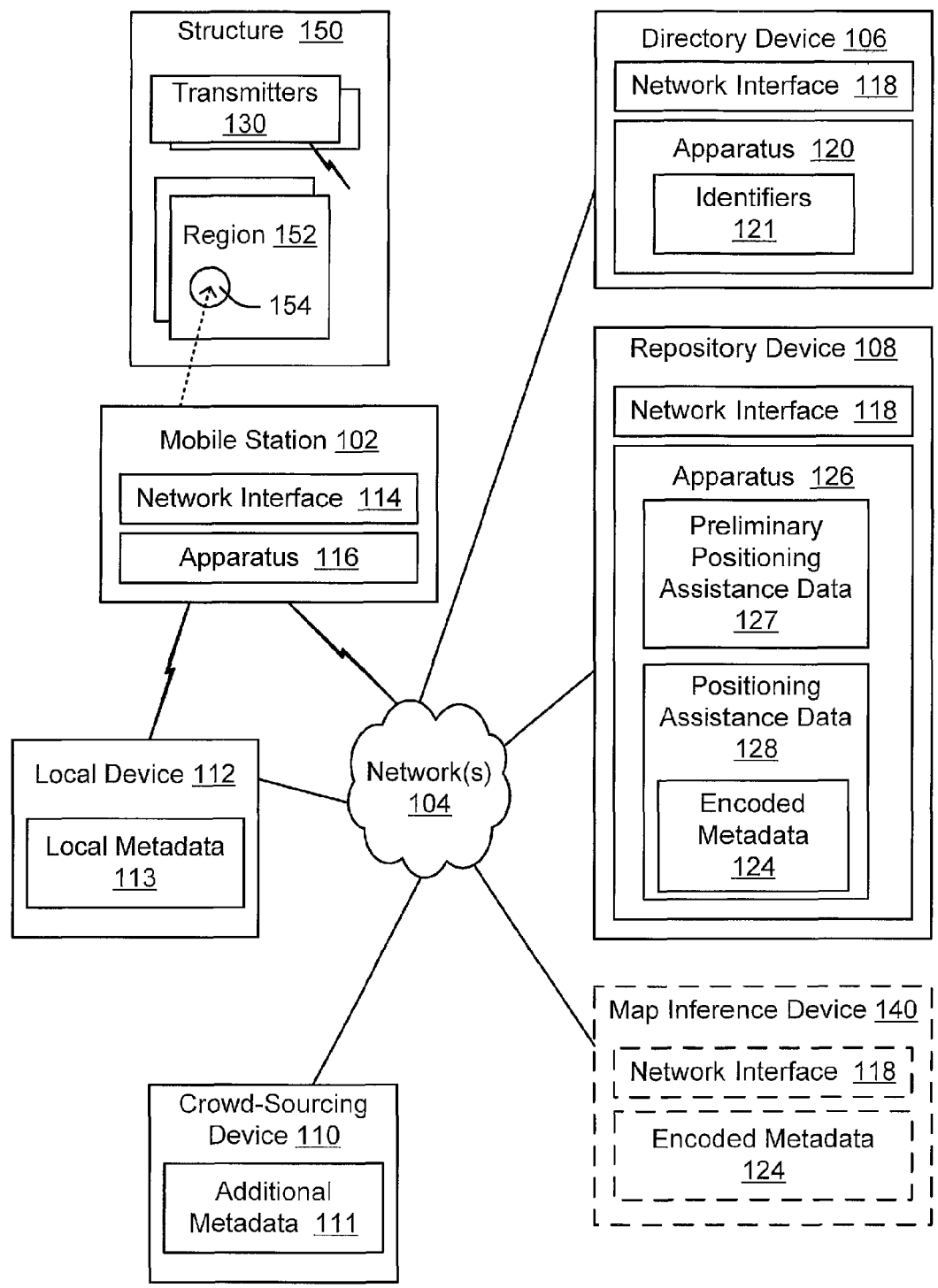
FIG. 1 is a schematic block diagram illustrating an example environment that includes a mobile station and several devices to determine or assist in determining that the mobile station is at a particular indoor region, in accordance with an implementation.

Some example methods and apparatuses are provided herein which may be implemented in various devices, such as, e.g., computing platforms and/or mobile stations, to determine or assist in determining that a mobile station is at one or more particular indoor regions.

By way of initial example, a method may be implemented at a mobile station to allow the mobile station to determine that it is currently at one or more particular indoor regions.

To arrive at such a determination, a mobile station may transmit a request for a repository device identifier to a directory device. Here, for example, a directory device (e.g., a server, etc.) may have a known network location that may be pre-programmed or otherwise obtained or determined by the mobile station. In certain instances, a request for a repository device identifier may indicate to a directory device at least a first estimated location of the mobile station. Such a first estimated location may in certain instances be a rough estimate. For example, a last know position fix may be included in a request to the directory device, and/or other information may be included in a request which may be of use to a directory device.

A mobile station may subsequently receive a response from the directory device which may identify one or more identifiers and/or the like for preliminary positioning assistance data that may be available or made available to the mobile station from one or more repository devices (e.g., servers, etc.). For example, one or more identifiers and/or the like may be provided for preliminary positioning assistance data relating to one or more indoor regions that the directory device has determined to be at or nearby to the first estimated location. For example, a first estimated location may indicate that a mobile station may be located near to a particular roadway intersection, and a directory device may provide such a mobile station with one or more identifiers for preliminary positioning assistance data relating to one or more indoor regions in buildings located at or nearby the intersection and which may be obtained by the mobile station from one or more repository devices. In certain example implementations, an identifier may comprise a location context identifier (LCI) and/or the like, which may uniquely identify an indoor region. In certain other examples, an identifier may comprise a Uniform Resource Locator (URL), a network address, and/or the like, which may point to or otherwise be indicative of a file, a directory location of a file, etc.

A mobile station may then, for example, obtain all or part of the preliminary positioning assistance data based, at least in part, on the identifiers received from a directory device. For example, a mobile station may transmit one or more requests for preliminary positioning assistance data for one or more of the one or more indoor regions to one or more applicable repository devices. In certain example implementations, a request for preliminary positioning assistance data may indicate at least one of the one or more identifiers. Subsequently, a mobile station may then, for example, receive all or part of the corresponding preliminary positioning assistance data from one or more applicable repository devices. Note that in certain instances, two or more regions may or may not overlap one another. Thus, it may be possible for a mobile station to be at two or more indoor regions. For example, all or part of a region for a bookstore may be operatively within a potentially larger region for a building or shopping mall in which the bookstore may be physically located.

In certain example implementations, preliminary positioning assistance data may comprise at least a portion of an access point locator for an indoor region. In certain example instances, an access point locator may include radio models, radio heatmaps, and/or other like RF signal related information and/or location information for with various wireless signal transmitters (e.g., access points, etc.) that may transmit signals at an indoor region which a mobile station may receive or otherwise detect. A mobile station may then, for example, determine on its own or possibly with support from another device (e.g., a repository device) that such mobile station is at a particular one or more of the one or more indoor regions. For example, a mobile station may determine that it is at (e.g., within, or nearby) a particular indoor region based, at least in part, on a signal characteristic measurement for a signal received from a transmitter identified in the preliminary positioning assistance data. In certain example implementations, a mobile station may obtain support in determining which of the one or more indoor regions it may be at, by transmitting a message indicative of signal characteristic measurements and/or the like to a repository device, directory device, etc., and receiving a response message therefrom indicating one or more determined indoor regions.

A mobile station may then, for example, transmit a request for positioning assistance data for a particular one of the one or more indoor regions to an applicable repository device, and receive the requested positioning assistance data from such a repository device. In certain example instances, positioning assistance data may comprise additional information that may be use to one or more functions (e.g., positioning functions, navigation functions, etc.) at a mobile station. For example, positioning assistance data may comprise an electronic map and/or an access point locator for an indoor region. For example, positioning assistance data may comprise encoded metadata corresponding to an electronic map or an access point locator for an indoor region. For example, positioning assistance data may comprise a connectivity graph, an RSSI heatmap, a probability heatmap, etc., for one or more indoor regions or a portion thereof.

A mobile station may then, for example, provide at least a portion of encoded or possibly decoded metadata to at least one function. In certain example implementations, a mobile station may subsequently determine a second estimated location, e.g., within a particular indoor region based, at least in part, on preliminary positioning assistance data, and/or positioning assistance data. For example, a second estimated location may be determined based, at least in part, on obtaining range measurements to a plurality of transmitters (e.g., three or more access points, etc.) having known locations.

In certain example implementations, one or more functions may be used, at least in part, to estimate a location of a mobile station within or with regard to at least one indoor region. For example, one or more functions may consider measured characteristics of one or more received signal(s). For example, estimating a location of a mobile station may comprise, at least in part, determining one or more coordinates for an estimated location of a mobile station with regard to some coordinate system. For example, estimating a location of a mobile station may comprise, at least in part, determining a position of mobile station relative to an indoor region, a structure, and/or some object, service, point of interest, etc., therein or there about. For example, estimating a location of a mobile station may comprise, at least in part, determining a movement (e.g., heading, velocity, etc.) or lack thereof of a mobile station, e.g., into, out of, or within at least one indoor region or structure, with regard to a coordinate system, and/or the like or any combination thereof.

In accordance with certain other aspects, a method may be implemented using one or more computing devices or the like at a directory station to assist a mobile station in determining that the mobile station it is currently at one or more particular indoor regions. A directory device may, for example, receive a request for a repository device identifier from a mobile station, wherein the request indicates at least a first estimated location of the mobile station. A directory device may then determine one or more indoor regions that may be at or nearby the first estimated location. For example, a directory device may, for example, maintain a database which relates various forms of location estimating information with identifiers for preliminary positioning assistance data that may be available or made available to a mobile station from various repository devices. For example, a identifier may comprise an LCI or other like identifier, a file name, an address in a memory or database, a network address, etc., which may be used to request or otherwise obtain at least preliminary positioning assistance data for at least one indoor location. A directory device may then, for example, transmit a response to the requesting mobile station identifying one or more identifiers for preliminary positioning assistance data for the one or more indoor regions. In certain example implementations, a directory device may also establish encoded metadata for an indoor region, e.g., based at least in part on an electronic map and/or an access point locator for the indoor region. A directory device may transmit all or part of the established encoded metadata to a repository device that may be capable of providing positioning assistance data comprising the encoded metadata to various mobile stations.

In accordance with certain other aspects, a method may be implemented using one or more computing devices or the like at a repository station to assist a mobile station in determining that the mobile station it is currently at one or more particular indoor regions. A repository device may, for example, receive a request for preliminary positioning assistance data for an indoor region from a mobile station, wherein the request indicates an identifier for the preliminary positioning assistance data. A repository device may then, for example, transmit preliminary positioning assistance data to the mobile station. As mentioned, in certain instances, preliminary positioning assistance data may comprise at least a portion of an access point locator for a particular indoor region. A repository device may subsequently receive a request for positioning assistance data for an indoor region from a mobile station, and transmit positioning assistance data to the mobile station. The navigation information may, for example, comprise encoded metadata for the indoor region. In certain example instances, all or part of such encoded metadata may be obtained from a directory device. For example, encoded metadata may comprise routing and/or feasibility information, point of interest (POI) information, etc., which may be useful in navigating an indoor region.

In certain example implementations, a mobile station may interface with other devices. For example, a mobile station may transmit collected data relating to an indoor region to a crowd-sourcing device and/or the like. For example, a mobile station may receive additional metadata for an indoor region from a crowd-sourcing device and/or the like, which may be provided to and used in at least one function. In another example, a mobile station may receive local metadata for an indoor region from a local device and/or the like, which may be provided to and used in at least one function, e.g., a positioning function, a navigation function, a location based service function, and/or the like.

In certain example instances, a repository device may establish all or part of an electronic map and/or all or part of an access point locator based, at least in part, on at least one venue diagram for an indoor region. For example, a computer aided design (CAD) diagram and/or other like file(s) may be processed via a map extraction phase to establish all or part of an electronic map and/or all or part of an access point locator.

As may be appreciated, there may be one or more repository devices and one or more directory devices, however in certain example implementations, it may be beneficial to provide substantially fewer, possibly more "centralized" or computationally powerful directory devices than repository devices. Of course, in some example implementations, various server farms and/or cloud computing arrangements may be configured to adapt as needed to serve as such devices. In certain instances, one or more of a directory device, a repository device or an inference device may all be hosted or otherwise provided in whole or part in one or more computing devices, e.g., a server, a server farm, etc.

As used herein the term "structure" may, for example, apply to (all or part of) one or more natural and/or man-made physical arrangements of object(s), the knowledge of which may be of use to a user of mobile station. For example, a structure may comprise all or part of a building that a user of a mobile station may enter into, exit from, and/or otherwise move about within. Some example structures may comprise a mixture of indoor and outdoor spaces.

As used herein the term "region" may, for example, relate to all or part of a structure that may be distinguished in some manner. In certain instances, for example, two or more different regions may be distinguished from one another based, at least in part, on various physical arrangements of objects, e.g., floors, ceilings, decks, walls, staircases, elevators, walkways, etc. Thus, for example, two or more regions of a structure may relate to two or more different levels (e.g., floors) of a building, two or more office suites in a building, stores in a shopping mall, etc.

FIG. 1 is a schematic block diagram illustrating an example environment 100 that includes a mobile station 102 and several devices to determine or assist in determining that mobile station 102 is at one or more particular indoor regions 152, in accordance with an implementation.

By way of example, mobile station 102 may comprise any electronic device that may be moved about by a user within a structure and which comprises a network interface 114 for receiving signals transmitted by transmitters 130 (e.g., access points, cell towers, etc.) and/or other resources in network(s) 104, etc. Thus, by way of some examples, mobile station 102 may comprise a cell phone, a smart phone, a computer (e.g., a personal computer such as a laptop computer, a tablet computer, a wearable computer, etc.), a navigation aid, a digital book reader, a gaming device, a music and/or video player device, a camera, etc.

Apparatus 116 is representative of circuitry, such as, e.g., hardware, firmware, a combination of hardware and software, and/or a combination of firmware and software or other like logic that may be provided in mobile station 102 for use in obtaining positioning assistance data 128.

In certain example implementations, mobile station 102 may function exclusively or selectively as a stand-alone device, and may provide one or more capabilities/services of interest/use to a user. In certain example implementations, mobile station 102 may communicate in some manner with one or more other devices, for example, as illustrated by the wireless communication link to the cloud labeled network(s) 104. Network(s) 104 may be representative of one or more communication and/or computing resources (e.g., devices and/or services) which mobile station 102 may communicate with or through, e.g., via network interface 114 using one or more wired or wireless communication links. Thus, in certain instances mobile station 102 may receive (or send) data and/or instructions via network(s) 104. In certain instances, mobile station 102 may, for example, not only receive a signal from a transmitter 110, but may also transmit a signal to such a transmitter (e.g., having a receiver).

In certain example implementations, mobile station 102 may be enabled to receive signals associated with one or more wireless communication networks, location services, and/or the like or any combination thereof which may be associated with one or more transmitters 110 and/or network(s) 104.

Mobile station 102 may, for example, be enabled (e.g., via network interface 114) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

In certain example implementations, mobile station 102 may be enabled (e.g., via network interface 114 or other location receiver) for use with various location service(s), such as, a Global Navigation Satellite System (GNSS), or other like satellite and/or terrestrial locating service, a location based service (e.g., via a cellular network, a WiFi network, etc.).

As illustrated in FIG. 1, mobile station 102 may be located at a location 154 in one or more indoor regions 152 of a structure 150. As mentioned, it may useful to provide positioning assistance data to mobile station 102. In this example, positioning assistance data 128 is shown as being available via a repository device 108. By way of example, positioning assistance data 128 may comprise information that may be processed and/or otherwise presented or used in some manner by mobile station 102 to assist in supporting one or more functions, e.g., positioning or navigation functions, as a user moves with mobile station within and/or nearby structure 150 and/or indoor region(s) 152.

In accordance with an example implementation, in order to request or otherwise access applicable positioning assistance data 128, mobile station 102 may first need to determine which indoor regions 152 it may be currently at (e.g., located within, located nearby). Thus, as mentioned in the initial example implementations above, mobile station 102 may communicate within a directory device 106 to obtain identifiers 121 for preliminary positioning assistance data 127. Based, at least in part, on identifiers 121, mobile station 102 may request preliminary positioning assistance data 127 from repository device 108. Mobile station 102 may then determine (on it's own or with support from one or more other devices) that it is at one or more particular indoor regions 152 based, at least in part, on a signal characteristic measurement for a signal received from one or more transmitters that may be identified in at least a portion of preliminary positioning assistance data 127. Having determined that it is at a particular indoor region 152, mobile station 102 may then, for example, request or otherwise obtain positioning assistance data 128 for the particular indoor region 154.

Accordingly, an example directory device 106 is illustrated as being connected to network(s) 104 via a network interface 118, which in certain implementations may be similar to network interface 114. Directory device 106 may, for example, comprise one or more computing platforms, e.g., servers, etc., which may provide an apparatus 120. Apparatus 120 may, for example, comprise a database and/or the like to determine which identifiers 121 are to be provided in a response to apparatus 116 in mobile station 102, e.g., via network interface 118, network(s) 104, and a network interface 114. In certain further example implementations, apparatus 120 may comprise an analyzer capability that may establish all or part of encoded metadata 124, which may be transmitted to repository device 108, e.g., via network interface 118, network(s) 104, and a network interface 118 in repository device 108.

Example repository device 108 is illustrated as being connected to network(s) 104 via its network interface 118, which in certain implementations may be similar to network interface 114. Repository device 108 may, for example, comprise one or more computing platforms, e.g., servers, etc., which may provide an apparatus 126. Repository device 108 may receive encoded metadata from directory device 106, e.g., via network interface 118, network(s) 104, and a network interface 118 in directory device 106. In certain instances, apparatus 126 may, for example, comprise an analyzer capability that may establish all or part of encoded metadata 124. As previously mentioned and further illustrated in subsequent examples, apparatus 126 may also process requests for preliminary positioning assistance data 127 and/or positioning assistance data 128 received via network interface 118 and initiate transmission of responses thereto. As illustrated, apparatus 126 may, for example, establish, maintain, or store preliminary positioning assistance data 127, and positioning assistance data 128, which may include all or part of encoded metadata. In certain example implementations, preliminary positioning assistance data 127 may comprise a subset of positioning assistance data 128, and/or may be derived from positioning assistance data 128.

In certain example implementations, mobile station 102 may transmit one or more messages to directory device 106 and/or repository device 108 that is indicative of one or more signal characteristic measurements for one or more signals received by mobile station 102 from one or more transmitters 110 which may have been identified in at least a portion of preliminary positioning assistance data 127. In response directory device 106 and/or repository device 108 determine that mobile station 102 is at a particular one or more of indoor regions 152 based, at least in part, on one or more of the signal characteristic measurements. One or more response messages may then be transmitted to mobile station 102 from directory device 106 and/or repository device 108 which indicate that mobile station 102 is at one or more particular indoor regions 152.

In certain example implementations, environment 100 may further comprise a map inference device 140, which as illustrated may be connected to network(s) 104 via a network interface 118. Network interface 118 may, for example, in certain implementations may be similar to network interface 114. Map inference device 106 may, for example, comprise one or more computing platforms, e.g., servers, etc., which may provide an apparatus 142. Apparatus 142 may, for example, comprise an analyzer capability 122 that may establish all or part of encoded metadata 124. Map inference device 140 may transmit encoded metadata 124 to a repository device 108, e.g., via network interface 118, network(s) 104, and a network interface 118 in repository device 108.

Also illustrated in FIG. 1, is an example, crowd-sourcing device 110, which may, for example, comprise one or more computing platforms, e.g., servers, etc., and may establish, maintain, or store additional metadata 111, and/or provide such to other devices and/or mobile station 102, e.g., via network(s) 104.

Similarly, a local device 112 which, for example, may comprise one or more computing platforms, e.g., servers, etc., may be provided which is capable of establishing, maintaining, storing, and/or providing local metadata 113, to other devices and/or mobile station 102, e.g., via network(s) 104, or possibly via a direct wireless link (which while shown outside of network(s) 104, may be provided within network(s) 104 too).

Figure 2:
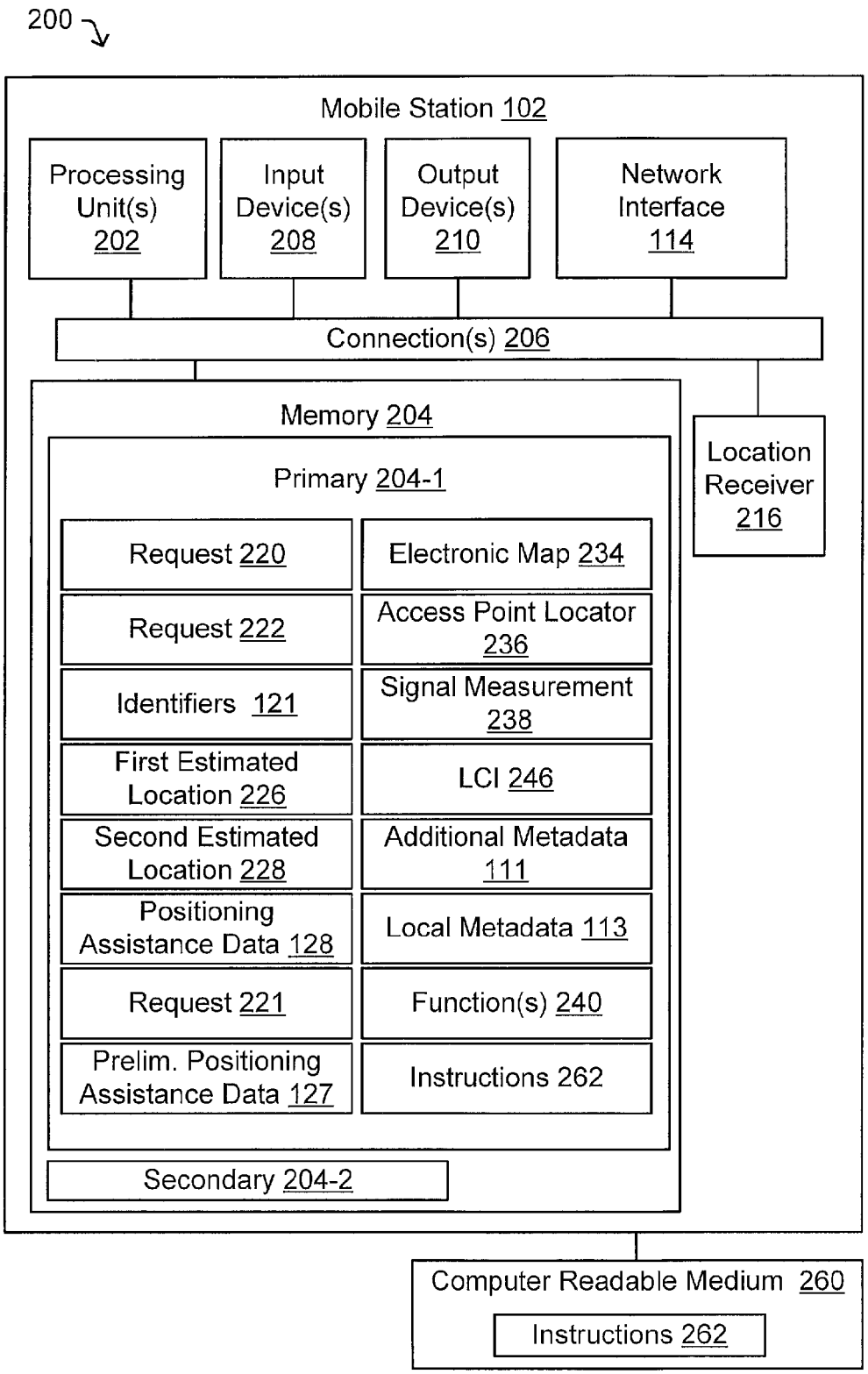
FIG. 2 is a schematic block diagram illustrating certain features of an example mobile station for use in obtaining and using certain positioning assistance data and/or the like to determine or assist in determining that the mobile station is at a particular indoor region, in accordance with an implementation.

FIG. 2 is a schematic block diagram illustrating certain features of an example mobile station 102, in the form of a special purpose electronic computing device 200, for use in obtaining and using preliminary positioning assistance data 127 and positioning assistance data 128, in accordance with an implementation.

As illustrated mobile station 102 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile station 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 260. Memory 204 and/or computer readable medium 260 may comprise instructions 262 associated with data processing, e.g., in accordance with the techniques and/or apparatus 116 (FIG. 1), as provided herein.

Mobile station 102 may, for example, further comprise one or more user input devices 208, one or more output devices 210, one or more network interfaces 114, and/or one or more location receivers 216.

Input device(s) 208 may, for example, comprise various buttons, switches, a touch pad, a trackball, a joystick, a touch screen, a microphone, a camera, and/or the like, which may be used to receive one or more user inputs. Output devices 210 may, for example, comprise various devices that may be used in producing a visual output, an audible output, and/or a tactile output for a user.

A network interface 114 may, for example, provide connectivity to one or more transmitters 110 and/or network(s) 104 (FIG. 1), e.g., via one or more wired and/or wireless communication links. Location receiver 216 may, for example, obtain signals from one or more location services, which may be used in estimating a location that may be provided to or otherwise associated with one or more signals stored in memory. For example, a location receiver may be used to estimate a first location that may indicate (possibly roughly) that mobile station 102 is at or nearby, or possibly approaching a particular structure/region.

Processing unit(s) 202 and/or instructions 262 may, for example, provide or otherwise be associated with one or more signals stored in memory 204, such as, one or more requests 220 for a repository device identifier 121, one or more requests 222 for positioning assistance data 128, one or more identifiers 121, a first estimated location 226, a second estimated location 228, positioning assistance data 128, one or more requests 221 for preliminary positioning assistance data 127, preliminary positioning assistance data 127, one or more electronic maps 234, one or more access point locators 236, one or more signal characteristic measurements 238, additional metadata 111, local metadata 113, instructions and/or data for or supportive of one or more functions 240 and/or the like or any combination thereof, e.g., as described in the various example techniques herein.

Figure 3:
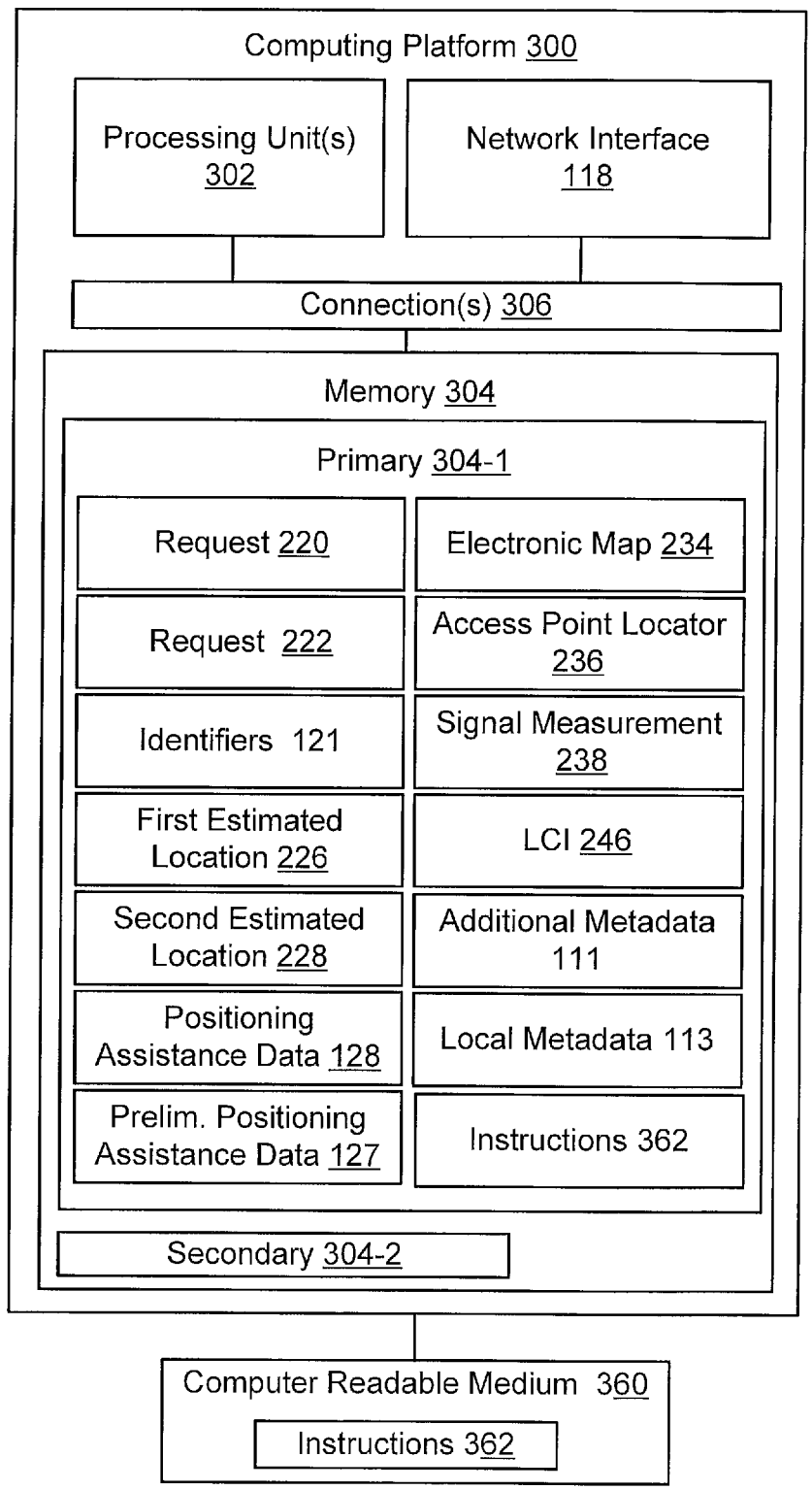
FIG. 3 is a schematic block diagram illustrating certain features of an example computing platform for use in one or more devices to establish and/or provide certain positioning assistance data and/or the like to a mobile station to determine or assist in determining that the mobile station is at a particular indoor region, in accordance with an implementation.

FIG. 3 is a schematic block diagram illustrating certain features of an example special purpose computing platform 300 for use one or more devices that may be used to establish and/or provide preliminary positioning assistance data 127 and/or positioning assistance data 128 and/or the like to mobile station 102, in accordance with an implementation. For example, directory device 106 or repository device 108 may comprise one or more special purpose computing platforms 300.

As illustrated special purpose computing platform 300 may comprise one or more processing units 302 to perform data processing (e.g., in accordance with the techniques provided herein) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within special purpose computing platform 300. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 360. Memory 304 and/or computer readable medium 360 may comprise instructions 362 associated with data processing, e.g., in accordance with the techniques and/or apparatus 120 or apparatus 126 (FIG. 1), as provided herein.

Special purpose computing platform 300 may, for example, further comprise one or more network interfaces 118. A network interface 118 may, for example, provide connectivity to network(s) 104, mobile station 102, and/or other devices (FIG. 1), e.g., via one or more wired and/or wireless communication links.

Processing unit(s) 302 and/or instructions 362 may, for example, provide or otherwise be associated with one or more signals stored in memory 304, such as, one or more requests 220 for a repository device identifier 121, one or more requests 222 for positioning assistance data 128, one or more identifiers 121, a first estimated location 226, a second estimated location 228, positioning assistance data 128, preliminary positioning assistance data 127, one or more electronic maps 234, one or more access point locators 236, one or more signal characteristic measurements 238, additional metadata 111, local metadata 113, and/or the like or any combination thereof, e.g., as described in the various example techniques herein.

FIG. 4 is a flow diagram illustrating certain features of an example process or method 400 for use in mobile station 102, for example, to determine that it may be at one or more particular indoor regions, in accordance with an implementation. At example block 402, mobile station 102 may transmit a request 221 for a repository device identifier 121 to directory device 106. For example, request 221 for the repository device identifier 121 may be indicative of at least first estimated location 226 of mobile station 102. In certain other example implementations, request 221 may comprise one or more signal characteristic measurements 238 for one or more signals received by mobile station 102 from one or more transmitters 110. In certain other example implementations, a request 221 may comprise a plurality of messages. At example block 404, mobile station 102 may receive a response from directory device 106 identifying one or more identifiers 121 for preliminary positioning assistance data 127 for one or more indoor regions 152 determined to be at or nearby to first estimated location 226. At example block 406, mobile station 102 may obtain preliminary positioning assistance data 127 from repository device 108 based, at least in part, on at least one of the identifiers. At example block 408, mobile station 102 may determine (e.g., on its own or with support from one or more other devices) that it is at a first one of the one or more indoor regions 152 based, at least in part, on a signal characteristic measurement 238 for a signal received from a transmitter identified in preliminary positioning assistance data 127.

Figure 5:
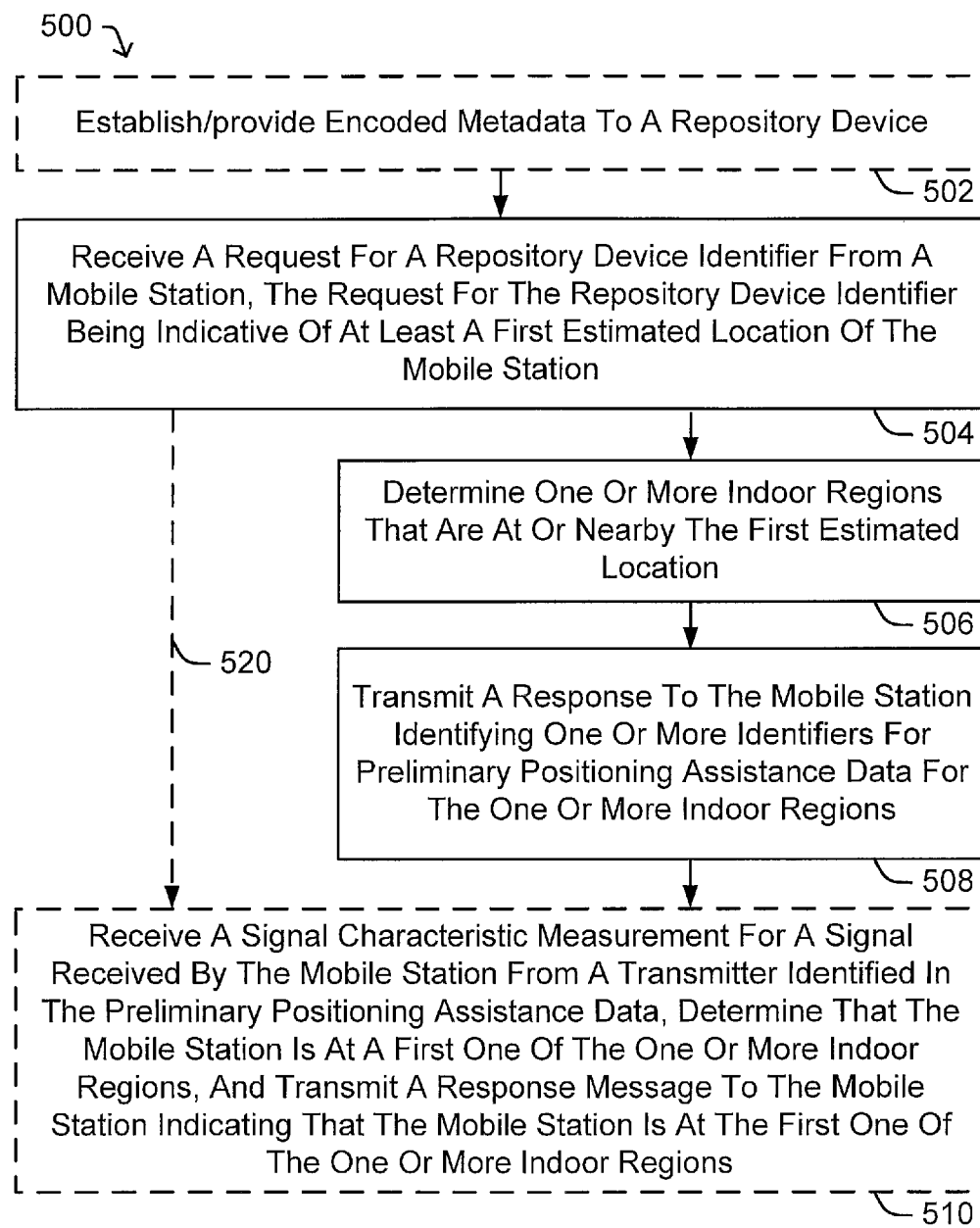
FIG. 5 is a flow diagram illustrating certain features of an example process or method for a computing platform at a directory device to at least assist in determining that a mobile station is at a particular indoor region, in accordance with an implementation.

FIG. 5 is a flow diagram illustrating certain features of an example process or method 500 for use in one or more special purpose computing platforms 300, e.g., at directory device 106, to at least assist in determining that mobile station 102 is at one or more particular indoor regions 152, in accordance with an implementation. At example block 502, which may be implemented in certain instances, directory device 106 may establish and/or otherwise provide all or part of encoded metadata 124 to repository device 108. In other instances, one or more devices other than directory device 106 may establish and/or otherwise provide all or part of encoded metadata 124 to repository device 108. At example block 504, directory device 106 may receive a request 220 for a repository device identifier 121 from mobile station 102, request 220 may be indicative of at least first estimated location 226 of mobile station 102. At example block 506, directory device 106 may determine one or more indoor regions that are at or nearby first estimated location 226. At example block 508, directory device 106 may transmit a response to mobile station 102 identifying one or more identifiers 121 for preliminary positioning assistance data 127 for one or more indoor regions 152. At example block 510, which may be implemented in certain instances, directory device 106 may receive a signal characteristic measurement 238 for a signal received by mobile station 102 from transmitter 110 identified in preliminary positioning assistance data 127, determine that mobile station 102 is at a first one of the one or more indoor regions, and transmit a response message to mobile station 102 indicating that mobile station 102 is at the first one of the one or more indoor regions.

It should be noted that in certain other example implementations, as illustrated by arrow 520, it may be possible for directory device 106 to skip over or delay one or both of blocks 506 and/or 508, and instead, at block 510, receive signal characteristic measurement 238 from mobile station 102 (e.g., communicated separately by mobile station 102, or as part of a request 222), and determine that mobile station 102 is at a particular indoor region, and transmit a response message to mobile station 102 indicating that mobile station 102 is at the particular one of the one or more indoor regions.

Figure 6:
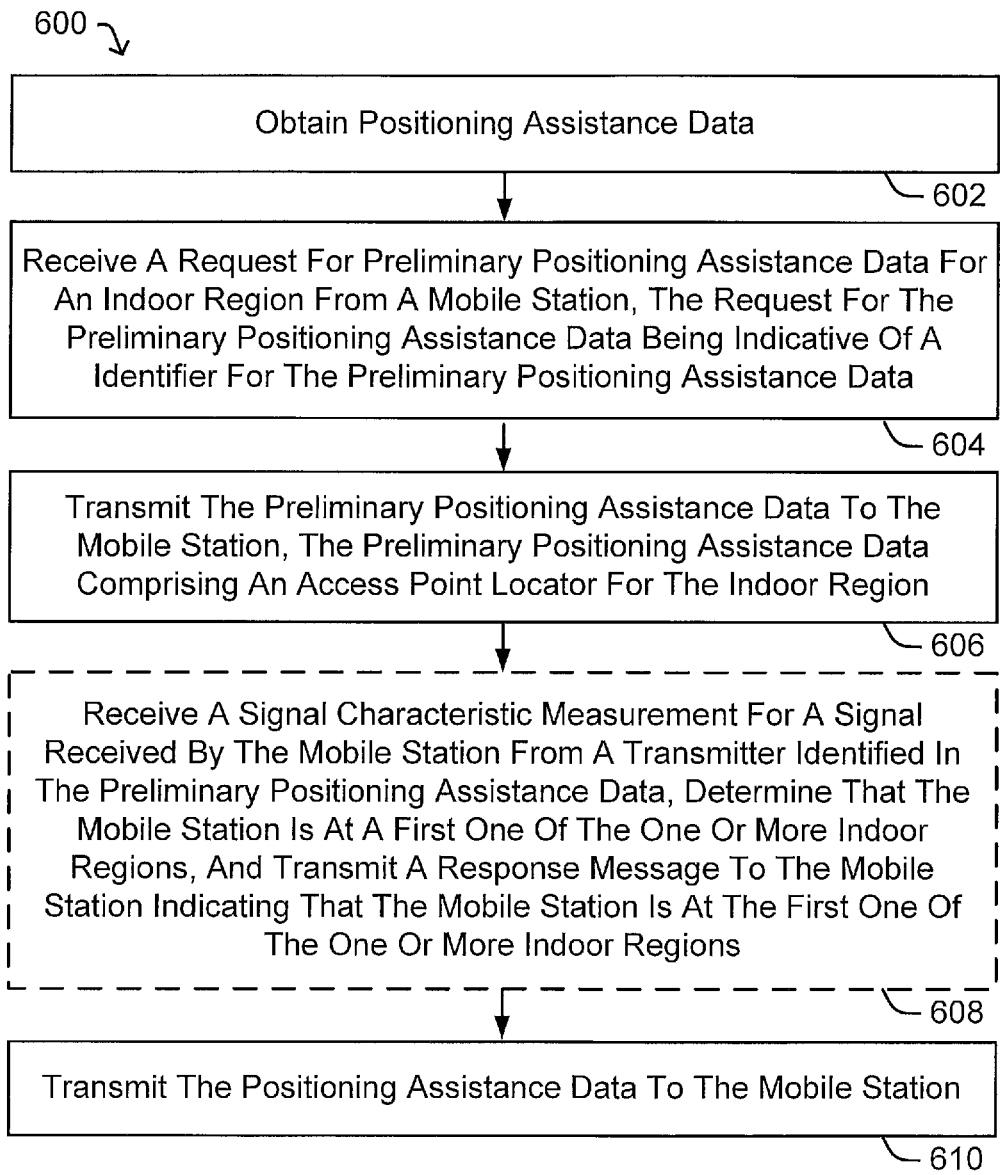
FIG. 6 is a flow diagram illustrating certain features of an example process or method for a computing platform at a repository device to at least assist in determining that the mobile station is at a particular indoor region, in accordance with an implementation.

FIG. 6 is a flow diagram illustrating certain features of an example process or method 600 for one or more special purpose computing platforms 300, e.g., at repository device 108, to at least assist in determining that the mobile station is at a particular indoor region, in accordance with an implementation. At example block 602, which may be implemented in certain instances, repository device 108 may obtain preliminary positioning assistance data 127 and positioning assistance data 128. For example, all or part of preliminary positioning assistance data 127 and positioning assistance data 128 may be obtained from other devices (e.g., directory device 106 or map inference device 140 may establish and/or otherwise provide all or part of encoded metadata 124, etc.). For example, all or part of preliminary positioning assistance data 127 and positioning assistance data 128 may be established or otherwise maintained at repository device 108. At example block 604, repository device 108 may receive a request 221 for preliminary positioning assistance data 127 for an indoor region 152 from mobile station 102, e.g., wherein request 221 may be indicative of one or more identifiers 121 for at least a portion of preliminary positioning assistance data 127. At example block 606, repository device 108 may transmit preliminary positioning assistance data 127 to mobile station 102, e.g., wherein preliminary positioning assistance data 127 may comprise an access point locator 236 for the indoor region. At example block 608, which may be implemented in certain instances, repository device 108 may further receive a signal characteristic measurement 238 for a signal received by mobile station 102 from transmitter 110 identified in preliminary positioning assistance data 127, determine that mobile station 102 is at a first one of the one or more indoor regions 152, and transmit a response message to mobile station 102 indicating that mobile station 102 is at the first one of the one or more indoor regions. At example block 610, repository device 108 may transmit positioning assistance data 128 to mobile station 102.

Figure 7:
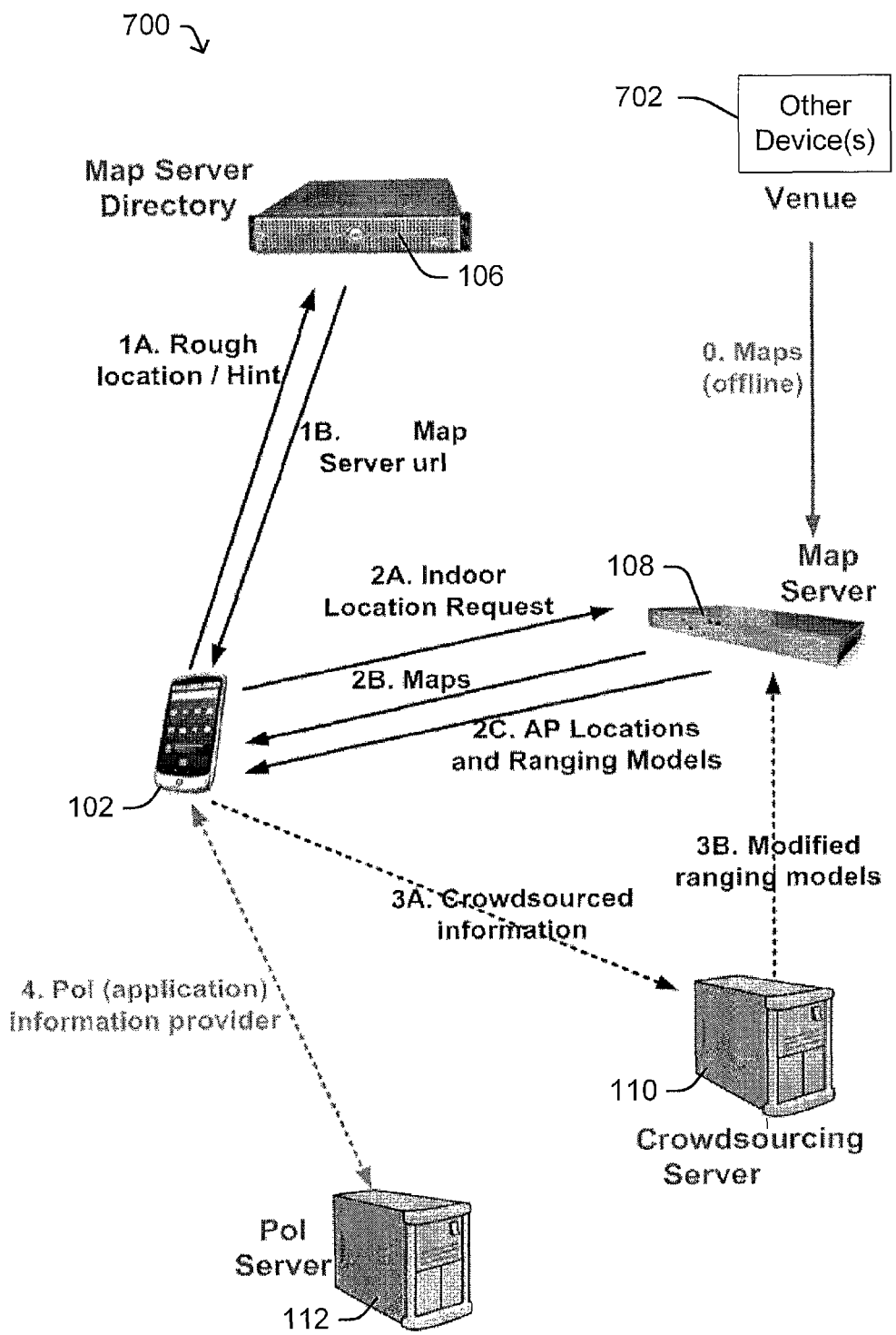
FIG. 7 is a schematic block diagram illustrating an example communication session that may be implemented in an example environment comprising a mobile station and several devices, in accordance with an implementation.

FIG. 7 is a schematic block diagram illustrating an example communication session 700 that may be implemented in an example environment to provide preliminary positioning assistance data and positioning assistance data and/or the like to mobile station 102, in accordance with an implementation. FIG. 7 is similar to FIG. 1, and also includes other devices 702, which may be associated with a venue having some knowledge with regard to one or more structures 150 and/or indoor regions 152. For example, a other devices 702 may comprise one or more special purpose computing platforms 300 or the like connected to network(s) 104, which may generate or otherwise provide various forms of maps, diagrams, etc., and/or access point (AP) locations, radio heatmaps, etc., that may then be used to establish electronic map 234 and/or access point locator 236 (e.g., see FIG. 2 and FIG. 3). Arrows with text are also shown in FIG. 7, which provide some examples of messages/information that may be communicated between the various devices, e.g., in accordance with example communication session 700.

As shown, example communication session 700 may include obtaining information from a venue, via one or more messages #0 between other devices 702 and repository device 108 (shown here as a "Map Sever"). Repository device 108 may then establish one or more applicable electronic maps 234 and/or access point locators 236. With one or more messages #1A, #1B between mobile station 102 and directory device 106 (shown here as a "Map Sever Directory"), mobile station 102 may use its rough location (e.g., first estimated location 226) to learn from the Map Server Directory which repository device(s) 108 to communicate with to request preliminary positioning assistance data 127. For example, message #1B may identify a repository device's URL, etc., and applicable identifiers 121 for preliminary positioning assistance data 127 for applicable indoor regions determined to be at or nearby first estimated location 226. With one or more messages #2A, #2B and #20 between mobile station 102 and an applicable repository device 108 (Map Server), mobile station 102 may obtain preliminary positioning assistance data 127, and possibly subsequently positioning assistance data 128.

With one or more messages #3A between mobile station 102 and a crowd-sourcing device 110 (shown here as a "Crowdsourcing Server"), mobile station may provide collected data and/or possibly receive additional metadata 111. Here, for example, collected data may include crowdsourced information and/or measurements that may be gathered or otherwise collected by mobile station 102, e.g., via one or more circuits, applications, user interfaces, etc. Additional metadata 111 may, for example, comprise metadata similar to encoded data but which has been derived, updated or otherwise modified based, at least in part, on information obtained by or others generated within crowd-sourcing device 110. For example, crowd-sourcing device 110 may make use of collected data from one or more mobile stations to update/correct existing AP locations, radio models, heatmaps, etc. As further shown, one or more messages #3B between crowd-sourcing device 110 and repository device 108 may be provided, e.g., for similar or other like purposes. In certain example implementations, an access point locator 236 may be based, at least in part, on crowdsourced information. For example, various radio models, ranging models, heatmaps, etc., may be established, updated, or otherwise affected at repository device 108 based on information obtained from crowd-sourcing device 110, other devices 702, and/or the like.

Further, in this example, one or more messages #4 between mobile station 102 and a local device 112 (shown here as a "POI Server") may be used to provide local metadata 113 and/or the like to mobile station 102, e.g., an indoor position of the mobile station may be used to trigger or otherwise obtain applicable POI information and services (e.g., location based services, etc.).

Figure 8:
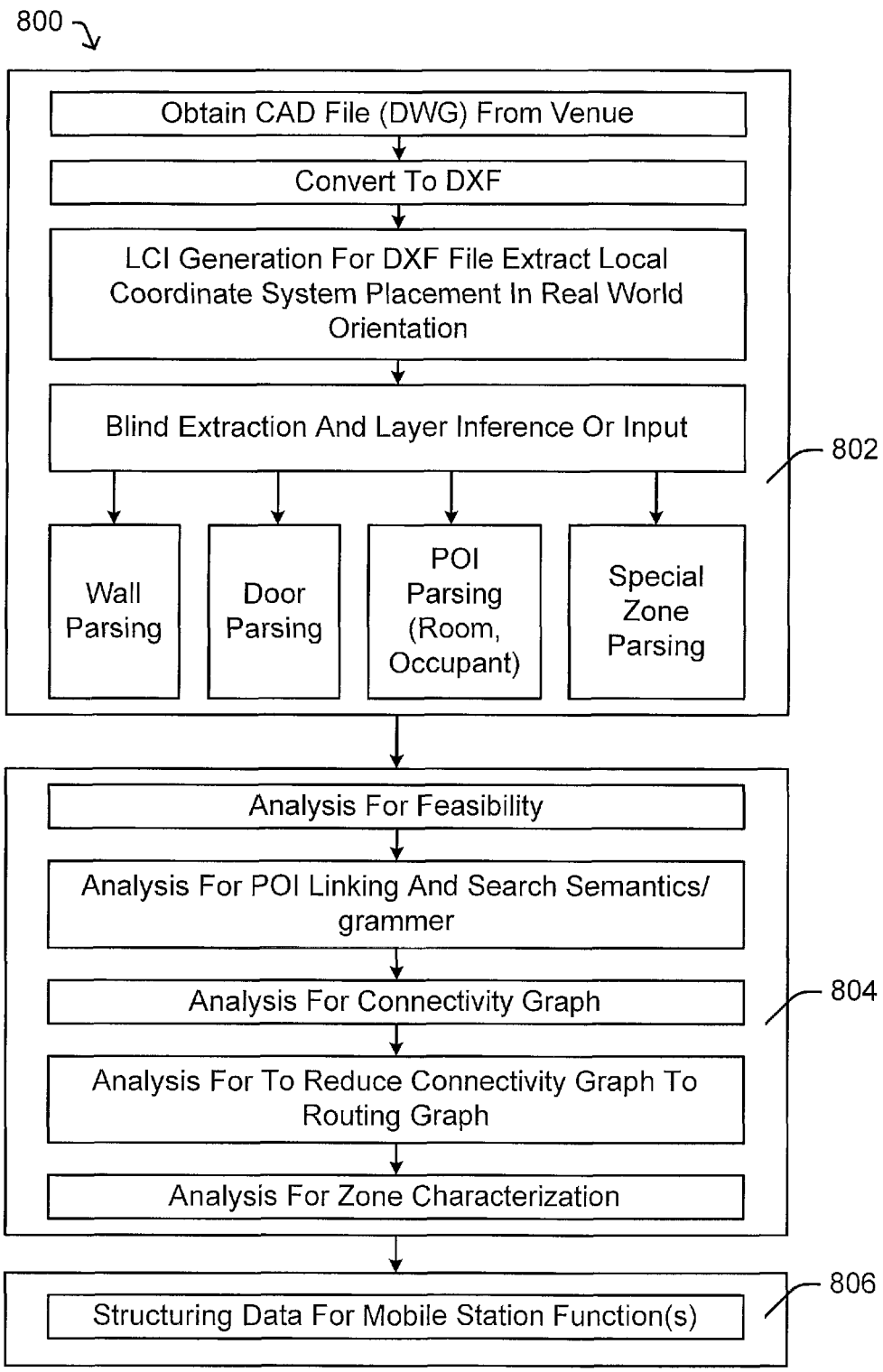
FIG. 8 is a flow diagram illustrating certain features of example processes or methods to establish an electronic map via a map extraction phase, establish encoded metadata via a map inference phase of an analyzer capability, and configure positioning assistance data for export to and/or use by a mobile station, in accordance with an implementation.

FIG. 8 is a flow diagram illustrating certain features of some example processes or methods 800 to establish an electronic map via a map extraction phase 802, establish encoded metadata via a map inference phase 804 (e.g., of an analyzer capability), and configure positioning assistance data 128 for export to and/or use by mobile station 102 via a map export phase 806, in accordance with an implementation.

Structure and/or region diagrams are often owned, controlled, or otherwise maintained by some entity or person associated with a particular venue. Some structure and/or region diagrams that may be provided for a venue may include embedded information about certain features and/or objects within a region. By way of example, some diagrams may provide a level of accuracy and detail that may be available in CAD diagrams or the like. Thus, assuming that the diagrams (maps) are available in an appropriate CAD format (e.g., drawing exchange format (DXF), etc.), they may be processed by repository device 108, as needed, into a suitable electronic format. In certain example implementations, some maps may be expressed in an Extensible Markup Language (XML), or other like language (e.g., GML, or KML, or CityGML, etc.) for ease of use, and possibly to ensure commonality across multiple devices.

Repository device 108, as a Map Server may, for example, host one or more maps of one or more LCIs, regions, structures, venues, etc. Repository device 108 may, for example, aggregate maps of many different LCIs. Hence, a scale and possibly ownership of such a Map Server may vary significantly. On one hand, a single entity (e.g., associated with an office building, or a mall) may host a repository device 108. In other examples, an entire campus or enterprise may host all their various maps on a single repository device 108. In still other example implementations, a third party may provide for a central repository device 108 for a wide number of venues. It should be noted that the various techniques provided herein may be implemented in various manners, including architectures that may be essentially agnostic to a scale of a map server.

Map extraction phase 802 may, for example, be performed at repository device 108, and/or other like devices. In example map extraction phase 802, a CAD file may be analyzed to determine the relevant information present in its many layers. The necessary pieces of information extracted may include, for example, walls, doors and entry/exit points. This analysis may also identify special zones like portals (e.g., elevators, escalators, stairs). Also, some POI information (e.g. Restroom) available in the CAD files may be extracted. Such extraction techniques and others are known and beyond the scope of this description. Moreover, subject matter claimed herein is not necessarily limited to any particular extraction techniques.

Map inference phase 804 may, for example, be performed at directory device 106, repository device 108, and/or other like devices. With map inference phase 804, certain features of a map may be analyzed, e.g., by a suite of algorithms, to determine useful metadata of the map. For example, as part of map inference phase 804, analysis may be performed as to a user's movement/access feasibility and/or infeasibility with respect to various parts of a map (e.g., and objects in a region represented thereby). In certain example instances, a dense connectivity graph may be determined, e.g., that may be utilized by a positioning function for accurate positioning, etc. In certain example instances, a connectivity graph may be determined and/or possibly reduced to form a routing graph, for use in navigation functions, and/or for other like purposes. In certain example instances, a probability map of a region maybe determined, e.g., based on routes, etc. In certain example instances, radio heatmaps or other like RF signal related information associated with a region may be determined, e.g., through map analysis and availability of known transmitter locations. In certain example instances, various points of interest may be linked or otherwise identified, e.g., based on determined relationships, etc.

In certain example implementations, it may be beneficial to have both map information and access point or other transmitter information available in map inference phase 804. Various like map inference techniques and others are known and beyond the scope of this description. Moreover, subject matter claimed herein is not necessarily limited to any particular map inference techniques.

In certain example implementations, an access point locator may include radio models, radio heatmaps, and/or other like RF signal related information associated with a region. In certain instances, it may be beneficial not include exact AP or transmitter locations in an access point locator. Radio heatmaps (e.g. RSSI heatmaps) may, for example, be expressed as signal strengths at various points in a region. Thus, exact AP/transmitter locations may not need to be relayed to mobile stations in certain implementations, e.g., particularly once encoded metadata has been established.

In certain example implementations, a first estimated location may be provided, at least in part, using a last known GPS fix, identifying WiFi access points being heard, or possibly via some text input from user or other sensed information (e.g., camera, scanner, microphone) that may possibly indicate or hint at a rough current location.

In certain example implementations, a directory device 106 may provide some positioning assistance data to a mobile station, e.g., by determining one or more nearby LCI(s), e.g., by looking such up in a database, etc.

In certain example implementations, map export phase 806 may establish encoded metadata 128 in XML-like formats, and/or the like. In certain instances, all or part of map export phase 806 may be performed at a directory device 106 and may take advantage of various forms of specific encoding, data compression, and/or data encryption techniques. In certain other example instances, all or part of map export phase 806 may be performed at a repository device 108, and/or the like. In still other instances, all or part of map export phase 806 may be performed along with similar actions regarding other data that may be included in positioning assistance data 128. Various data exportation, processing, conversion, techniques and others are known and beyond the scope of this description. Moreover, subject matter claimed herein is not necessarily limited to any particular data formatting techniques.

With this in mind, in certain example implementations electronic maps of indoor spaces stored at a repository device 108 may be derived from a CAD drawing. Here, such a CAD drawing may show rooms and hallways formed by walls, doorways, etc. A CAD drawing may be transformed to a particular format usable as a digital map, the digital map may be electronically stored for access by mobile stations upon request as discussed above. Thus, for example, a CAD drawing or the like of an indoor space may be transformed to one or more retrievable digital maps in an "interchange format" (e.g., as editable XML documents) stored on repository device 108 for retrieval as discussed in the various examples herein. As such, the digital maps in such an interchange format may, for example, be updated to incorporate additional information or reflect changes to an indoor space without re-transforming a modified CAD drawing, for example.

In one particular implementation, changes to a venue may affect the usefulness or accuracy of preliminary positioning assistance data 127 and/or positioning assistance data 128. For example, changes in a number and/or location of RF beacon and/or other like transmitters 110 may affect particular ranging models that may be used. Additionally, changes in a map topology (e.g., of an indoor region) may affect ranging models and/or physical routing constraints. As illustrated herein, repository device 108 may provide preliminary positioning assistance data 127 and positioning assistance data 128 to mobile station 102 determined to be at an indoor region for a venue. Thus, in certain example implementations, repository device 108 may be dedicated to serving mobile stations at indoor regions of a particular structure or structures related to a particular venue. Alternatively, repository device 108 may serve mobile stations in multiple different indoor regions/structures, relating a plurality of venues.

As particular algorithms for updating preliminary positioning assistance data 127 or positioning assistance data 128 (and in particular encoded metadata 124) may be proprietary, dynamic and complex, it may not be practical to update certain data at a repository device 108 dedicated to serving mobile stations relating to a particular venue. Likewise, it may not be practical to have a repository device 108 dedicated to serving mobile stations in multiple regions/structures update certain data responsive to changed conditions.

Here, for example, such a web service may be implemented using standard protocols to transmit data objects among applications over an Internet protocol such as, for example, HTTP, HTTPS, XML, SOAP, WSDL and/or UDDI standards. Thus, for example, in certain implementations it may be useful to provide a web service that may be efficiently accessed by a mobile station, e.g., using HTTP, etc. Although not necessary, in certain example instances, it may be beneficial to implement a web service model that may be used for updating one or more data files (e.g., positioning assistance data or the like, between various computing devices). In the particular example shown below, and as described above, a repository device 108 in acting as a "venue server", for example, may perform map extraction (e.g., from a CAD file) and store extracted map information and locations of beacon transmitters (APs as shown in the particularly illustrated implementation) as XML data. To obtain certain positioning assistance data (such as ranging models, etc., in an access point locator 236), a venue server may make a web services call to a remote server (e.g., other device(s) 702, crowdsourcing device 110, etc.) specifying map data (e.g., in XML format) of at least a portion of locations of RF beacon transmitters provided by a venue. As shown in the figure below, a web service call from a venue server to a remote server may specify or include map data (e.g., based upon map data extracted from a CAD file) and access point locator data (e.g., locations of access points, etc.) in a region. A remote server may, for example, apply state of the art and proprietary algorithms in generating or determining preliminary positioning assistance data 127 and/or positioning assistance data 128 such as access point locator 236 comprising ranging models (e.g., heatmap data), probability heatmap data, etc. Preliminary positioning assistance data 127 and/or positioning assistance data 128 may then be transmitted to a file server portion of repository device 108 to then be distributed to mobile stations. As mentioned, in certain example implementations, all or part of positioning assistance data 128 may be stored in a repository device in various (possibly standardized) file formats, e.g., XML, etc., to facilitate delivery to mobiles, using a web service or the like.

In a particular example implementation, a single web service may be used to provide preliminary positioning assistance data 127 and/or positioning assistance data 128 to multiple venue servers operated by multiple different parties. Here, for example, a standard web service interface may allow multiple different parties to interact with a web service according to a predefined protocol and over a predefined interface. As such, proprietary algorithms or the like may be maintained and executed by a remote server in response to calls from several different parties while maintaining control of dissemination of such algorithms. Additionally, software code implementing such proprietary algorithms may be conveniently updated at a single remote server.

As previously mentioned, in certain example implementations, as part of, or possibly in addition to, an indication of its rough estimated location (e.g., first estimated location), a mobile station may indicate various signal measurements for signals it has received from various transmitters. Thus, based at least in part on such information, a directory device may be able to provide an identifier for a particular repository device and possibly a specific LCI or the like to the mobile station.

In another particular implementation, instead of having a local map server directory determine an LCI for an indoor region covering a rough estimated location of a mobile device, a local map server directory may merely provide identifiers 121 (e.g., universal resource identifiers or universal resource locators, etc.), which may enable a mobile station to determine an applicable LCI for its current location. Thus, as illustrated in the various examples herein, a mobile device may provide a hint or rough location to a directory device, but rather than immediately receiving a unique LCI from a local map server directory, the mobile device may receive identifiers 121 for preliminary positioning assistance data 127 which may cover regions identifiable by multiple LCIs. Such identifiers 127 may, for example, be formatted for use in accessing all or portions of preliminary positioning assistance data 127 and/or positioning assistance data 128 through a remote web service as follows:

APLocations.01.xml, APLocations.02.xml, . . .
Connectivity.01.xml, Connectivity.02.xml, . . .
RSSIHeatmap.01.xml, RSSIHeatmap.02.xml, . . .
. . .
ProbHeatmap.01.xml, ProbHeatmap.02.xml, . . .

Here, for example, a map directory server need not have any capability to precisely resolve a unique LCI covering an indoor region at or nearby the rough estimated location of the mobile station as the mobile station, with access to access point locations covering a large area defined by the multiple LCIs, may be capable of resolving such a unique LCI on its own. By downloading the locations of access points covering areas identified by the multiple LCIs. A mobile station may then obtain a position fix by obtaining range measurements to three or more access points (e.g., using RSSI or round-trip delay, etc.) and trilaterating among the three or more access points to obtain a position fix. Having an accurate position fix, a mobile station may then resolve its own unique LCI by, for example, associating its accurate position fix with an indoor region covered by a unique LCI. Once a mobile station determines a unique LCI identifying an indoor region covering the accurate position fix, the mobile station may then use the previously obtained identifiers to obtain/download remaining positioning assistance data 128 (e.g., including encoded metadata).

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile station:
   transmitting a request for a repository device identifier to a directory device, said request for said repository device identifier being indicative of at least a first estimated location of said mobile station;
   receiving a response from said directory device, said response identifying one or more identifiers for preliminary positioning assistance data for one or more indoor regions determined to be at or nearby to said first estimated location;
   transmitting a request for said preliminary positioning assistance data for at least one of said one or more indoor regions to a repository device corresponding to at least one of said identifiers;
   receiving said preliminary positioning assistance data from said repository device;
   determining that said mobile station is in a first one of said one or more indoor regions based, at least in part, on a signal characteristic measurement for a signal received from a transmitter identified in said at least said portion of said preliminary positioning assistance data:
   transmitting a request for positioning assistance data for said first one of said one or more indoor regions to said repository device;
   receiving said positioning assistance data from said repository device, said positioning assistance data comprising encoded metadata corresponding to at least one of an electronic map for said first one of said one or more indoor regions, or an access point locator for said first one of said one or more indoor regions;
   decoding said encoded metadata; and
   providing at least a portion of said decoded metadata to at least one function.

2. The method as recited in claim 1, wherein said preliminary positioning assistance data comprises at least a portion of an access point locator for said first one of said one or more indoor regions.

3. The method as recited in claim 1, wherein said request for said preliminary positioning assistance data is indicative of at least one of said one or more identifiers.

4. The method as recited in claim 1, wherein at least one of: said preliminary positioning assistance data, or said positioning assistance data is received by from said repository device via a web service.

5. The method as recited in claim 1, and further comprising, at said mobile station:
   determining a second estimated location of said mobile station within said first one of said one or more indoor regions based, at least in part, on at least one of: said preliminary positioning assistance data, or said positioning assistance data.

6. The method as recited in claim 5, wherein determining said second estimated location comprises:
   obtaining range measurements to at least three of transmitters; and determining said second estimated location based, at least in part, on said range measurements.

7. The method as recited in claim 1, wherein said at least one function comprises at least one of: a positioning function, a navigation function, or a location based service function.

8. The method as recited in claim 4, wherein said positioning assistance data comprises at least one of: a connectivity graph, an RSSI heatmap or a probability heatmap for said first one of said one or more indoor regions.

9. The method as recited in claim 1, wherein determining that said mobile station is at said first one of said one or more indoor regions further comprises:
transmitting a message indicative of at least said signal characteristic measurement to said repository device; and
receiving a response message from said repository device indicative that said mobile station is at said first one of said one or more indoor regions.

10. The method as recited in claim 1, wherein determining that said mobile station is at said first one of said one or more indoor regions further comprises:
transmitting a message indicative of at least said signal characteristic measurement to said directory device; and
receiving a response message from said directory device indicative that said mobile station is at said first one of said one or more indoor regions.

11. The method as recited in claim 1, wherein a first one of said one or more identifiers comprises a location context identifier (LCI) for said first one of said one or more indoor regions.

12. An apparatus for use in a mobile station, the apparatus comprising:
means for initiating transmission of a request for a repository device identifier to a directory device, said request for said repository device identifier being indicative of at least a first estimated location of said mobile station;
means for receiving a response from said directory device, said response identifying one or more identifiers for preliminary positioning assistance data for one or more indoor regions determined to be at or nearby to said first estimated location;
means for transmitting a request for said preliminary positioning assistance data for at least one of said one or more indoor regions to a repository device corresponding to at least one of said identifiers;
means for receiving said preliminary positioning assistance data from said repository device;
means for determining that said mobile station in a first one of said one or more indoor regions based, at least in part, on a signal characteristic measurement for a signal received from a transmitter identified in said at least said portion of said preliminary positioning assistance data:,
means for initiating transmission of a request for positioning assistance data for said first one of said one or more indoor regions to said repository device;
means for receiving said positioning assistance data from said repository device, said positioning assistance data com comprising encoded metadata corresponding to at least one of an electronic map for said first one of said one or more indoor regions, or an access point locator for said first one of said one or more indoor regions;
means for decoding said encoded metadata; and
means for providing at least a portion of said decoded metadata to at least one function.

13. The apparatus as recited in claim 12, wherein said preliminary positioning assistance data comprises at least a portion of an access point locator for said first one of said one or more indoor regions.

14. The apparatus as recited in claim 12, wherein said request for said preliminary positioning assistance data is indicative of at least one of said one or more identifiers.

15. The apparatus as recited in claim 12, wherein at least one of: said preliminary positioning assistance data, or said positioning assistance data is received by from said repository device via a web service.

16. The apparatus as recited in claim 12, and further comprising:
means for determining a second estimated location of said mobile station within said first one of said one or more indoor regions based, at least in part, on at least one of: said preliminary positioning assistance data, or said positioning assistance data.

17. The apparatus as recited in claim 12, wherein said means for determining that said mobile station is at said first one of said one or more indoor regions further comprises:
means for initiating transmission of a message indicative of at least said signal characteristic measurement to said repository device; and
means for receiving a response message from said repository device indicative that said mobile station is at said first one of said one or more indoor regions.

18. The apparatus as recited in claim 12, wherein said means for determining that said mobile station is at said first one of said one or more indoor regions further comprises:
means for initiating transmission of a message indicative of at least said signal characteristic measurement to said directory device; and
means for receiving a response message from said directory device indicative that said mobile station is at said first one of said one or more indoor regions.

19. A mobile station comprising:
a network interface; and
a processing unit to:
initiate transmission of a request for a repository device identifier to a directory device via said network interface, said request for said repository device identifier being indicative of at least a first estimated location of said mobile station;
obtain a response from said directory device via said network interface, said response identifying one or more identifiers for preliminary positioning assistance data for one or more indoor regions determined to be at or nearby to said first estimated location;
initiate transmission, via said network interface, of a request for said preliminary positioning assistance data for at least one of said one or more indoor regions to a repository device corresponding to at least one of said identifiers;
receive, via said network interface, said preliminary positioning assistance data from said repository device;
determine that said mobile station in a first one of said one or more indoor regions based, at least in part, on a signal characteristic measurement for a signal received from a transmitter identified in said at least said portion of said preliminary positioning assistance data:
initiate transmission of a request for positioning assistance data for said first one of said one or more indoor regions to said repository device via said network interface;
obtain said positioning assistance data from said repository device via said network interface, said positioning assistance data comprising encoded metadata corresponding to at least one of an electronic map for said first one of said one or more indoor regions, or an access point locator for said first one of said one or more indoor regions;

decode said encoded metadata; and provide at least a portion of said decoded metadata to at least one function.

20. The mobile station as recited in claim 19, wherein said preliminary positioning assistance data comprises at least a portion of an access point locator for said first one of said one or more indoor regions.

21. The mobile station as recited in claim 19, wherein said request for said preliminary positioning assistance data is indicative of at least one of said one or more identifiers.

22. The mobile station as recited in claim 19, wherein at least one of: said preliminary positioning assistance data, or said positioning assistance data is obtained from said repository device via said network interface using a web service.

23. The mobile station as recited in claim 19, said processing unit to further:

determine a second estimated location of said mobile station within said first one of said one or more indoor regions based, at least in part, on at least one of: said preliminary positioning assistance data, or said positioning assistance data.

24. The mobile station as recited in claim 19, said processing unit to further:

initiate transmission of a message indicative of at least said signal characteristic measurement to said repository device via said network interface; and obtain a response message from said repository device via said network interface, said response message being indicative that said mobile station is at said first one of said one or more indoor regions.

25. The mobile station as recited in claim 19, said processing unit to further:

initiate transmission of a message indicative of at least said signal characteristic measurement to said directory device via said network interface; and obtain a response message from said directory device via said network interface, said response message being indicative that said mobile station is at said first one of said one or more indoor regions.

26. An article comprising:

a non-transitory computer readable medium having stored therein computer implementable instructions that are executable by a special purpose electronic computing device to:

initiate transmission of a request for a repository device identifier to a directory device, said request for said repository device identifier being indicative of at least a first estimated location of said mobile station;

obtain a response from said directory device, said response identifying one or more identifiers for preliminary positioning assistance data for one or more indoor regions determined to be at or nearby to said first estimated location;

initiate transmission of a request for said preliminary positioning assistance data for at least one of said one or more indoor regions to a repository device corresponding to at least one of said identifiers;

receive said preliminary positioning assistance data from said repository device; and determine that said mobile station in a first one of said one or more indoor regions based, at least in part, on a signal characteristic measurement for a signal received from a transmitter identified in said at least said portion of said preliminary positioning assistance data; and initiate transmission of a request for positioning assistance data for said first one of said one or more indoor regions to said repository device;

obtain said positioning assistance data from said repository device, said positioning assistance data comprising encoded metadata corresponding to at least one of an electronic map for said first one of said one or more indoor regions, or an access point locator for said first one of said one or more indoor regions;

decode said encoded metadata; and provide at least a portion of said decoded metadata to at least one function.

27. The article as recited in claim 26, wherein said preliminary positioning assistance data comprises at least a portion of an access point locator for said first one of said one or more indoor regions.

28. The article as recited in claim 26, wherein said request for said preliminary positioning assistance data is indicative of at least one of said one or more identifiers.

29. The article as recited in claim 26, wherein at least one of: said preliminary positioning assistance data, or said positioning assistance data is obtained from said repository device through a web service.

30. The article as recited in claim 26, said computer implementable instructions being further executable by said special purpose electronic computing device to:

determine a second estimated location of said mobile station within said first one of said one or more indoor regions based, at least in part, on at least one of: said preliminary positioning assistance data, or said positioning assistance data.

31. The article as recited in claim 26, said computer implementable instructions being further executable by said special purpose electronic computing device to:

initiate transmission of a message indicative of at least said signal characteristic measurement to said repository device; and obtain a response message from said repository device indicative that said mobile station is at said first one of said one or more indoor regions.

32. The article as recited in claim 26, said computer implementable instructions being further executable by said special purpose electronic computing device to:

initiate transmission of a message indicative of at least said signal characteristic measurement to said directory device; and obtain a response message from said directory device indicative that said mobile station is at said first one of said one or more indoor regions.

* * * * *